US012583388B2

(12) United States Patent
Chung et al.

(10) Patent No.: US 12,583,388 B2
(45) Date of Patent: Mar. 24, 2026

(54) VEHICLE MIRROR CAMERA SYSTEMS

(71) Applicant: Daimler Truck North America LLC, Portland, OR (US)

(72) Inventors: Stacy Lynn Mann Chung, Portland, OR (US); Markus Mayer, Hillsboro, OR (US); Dinesh Madugundi, Beaverton, OR (US); Ruben Lucescu, Newberg, OR (US); Michael Gatza, Clackamas, OR (US)

(73) Assignee: Daimler Truck North America LLC, Portland, OR (US)

( * ) Notice: Subject to any disclaimer, the term of this patent is extended or adjusted under 35 U.S.C. 154(b) by 0 days.

(21) Appl. No.: 18/867,918

(22) PCT Filed: Jun. 10, 2022

(86) PCT No.: PCT/US2022/032980
§ 371 (c)(1),
(2) Date: Nov. 21, 2024

(87) PCT Pub. No.: WO2023/239372
PCT Pub. Date: Dec. 14, 2023

(65) Prior Publication Data
US 2025/0145085 A1     May 8, 2025

(51) Int. Cl.
*B60R 1/00* (2022.01)
*B60R 1/12* (2006.01)
(Continued)

(52) U.S. Cl.
CPC .................. *B60R 1/26* (2022.01); *B60R 1/12* (2013.01); *B60R 11/04* (2013.01); *B60R 2001/1253* (2013.01); *B60R 2011/004* (2013.01)

(58) Field of Classification Search
None
See application file for complete search history.

(56) References Cited

U.S. PATENT DOCUMENTS 9,637,053 B2     5/2017  Schofield et al.
10,195,994 B2    2/2019  Abdel-Rahman et al.
(Continued)

FOREIGN PATENT DOCUMENTS

DE     102011113323 A1    5/2012
EP         2692585 A1     2/2014
(Continued)

OTHER PUBLICATIONS

ISR and Written Opinion for PCT/US2022/032980, dated Sep. 15, 2022.
(Continued)

*Primary Examiner* — Zhihan Zhou
(74) *Attorney, Agent, or Firm* — ArentFox Schiff LLP

(57) ABSTRACT

Vehicle mirror camera systems (MCSs) with improved anti-soiling and aerodynamic performance are disclosed that in some examples include a camera enclosure housing a camera and an illumination source disposed within recesses of a front enclosure surface and including upper, left, and right enclosure surfaces having a declining slope in a rearward direction. The right enclosure surface has a declining slope in a rightward direction. The upper enclosure surface includes a groove disposed toward the front enclosure surface. A mount portion attaches to a vehicle and facilitates electrical connectivity of imaging components to a power source. The mount portion includes a left mount surface having a declining slope in a leftward direction. An extension portion is disposed between the camera enclosure and mount portion and includes left and right extension surfaces having an inclining slope that meets the declining slope of
(Continued)

the right enclosure surface and the left mount surface, respectively.

19 Claims, 11 Drawing Sheets

(51) Int. Cl.
| | |
|---|---|
| *B60R 1/26* | (2022.01) |
| *B60R 11/04* | (2006.01) |
| *B60R 11/00* | (2006.01) |

(56) References Cited

U.S. PATENT DOCUMENTS

| | | | |
|---|---|---|---|
| 10,676,030 B2 | 6/2020 | Nakai et al. | |
| 2006/0171704 A1 | 8/2006 | Bingle et al. | |
| 2007/0051646 A1 | 3/2007 | Imoto et al. | |
| 2009/0066836 A1* | 3/2009 | Yang | B60R 1/10 |
| | | | 348/373 |
| 2011/0267466 A1 | 11/2011 | Brester | |
| 2015/0138357 A1 | 5/2015 | Romack et al. | |
| 2015/0195435 A1* | 7/2015 | Oshida | H04N 23/54 |
| | | | 348/373 |
| 2016/0100084 A1* | 4/2016 | Schofield | B60K 35/10 |
| | | | 348/148 |
| 2016/0373620 A1 | 12/2016 | Sato et al. | |
| 2017/0028918 A1 | 2/2017 | Sato et al. | |
| 2017/0066377 A1* | 3/2017 | Okabe | B60R 1/06 |
| 2018/0009394 A1* | 1/2018 | Okabe | G06V 20/52 |
| 2018/0199873 A1* | 7/2018 | Wang | C12Q 1/006 |
| 2018/0290594 A1* | 10/2018 | Abdel-Rahman | B60R 1/06 |
| 2020/0076996 A1* | 3/2020 | Yoshii | H04N 23/57 |
| 2021/0031694 A1* | 2/2021 | Bhaskar | B60Q 1/0088 |

FOREIGN PATENT DOCUMENTS

| | | | |
|---|---|---|---|
| EP | 2851243 A1 | 3/2015 |
| JP | 2007062670 A | 3/2007 |
| JP | 2009286216 A | 12/2009 |
| JP | 2009290527 A | 12/2009 |
| JP | 2010078978 A | 4/2010 |
| JP | 2010177837 A | 8/2010 |
| JP | 2013009211 A | 1/2013 |
| JP | 2013109188 A | 6/2013 |
| JP | 2015207020 A | 11/2015 |
| WO | 2005094063 A1 | 10/2005 |
| WO | 2017041886 A1 | 6/2017 |
| WO | 2018136610 A1 | 7/2018 |

OTHER PUBLICATIONS

"Samvardhana Motherson Reflectec (Formerly Visiocorp plc)," MarkLines Automotive Industry Portal (2022).
"Future Truck 2025," Autonomer Pionier (2015).
"Mercedes-Benz Future Truck 2025," Autonomer Pionier (2015).
"Mercedes-Benz Future Truck 2025," Auto-News, Auf dem Weg in die Zukunft (2014).
"Mercedes Benz Future Truck Daimler blickt in Jahr 2025" (2014).
"Mercedes-Benz Future Truck 2025," MyAuto24, Blick in die Zukunft (2014).
"Mercedes Future Truck 2025," Fahrbericht—autobild.de (2014).
Europe Design Patent Application No. 002532473-0001 (2014).
"Future Truck 2025," Weltpremiere der spektakularen Studie des Lkw von morgen (2014).
"Autobild, Future Truck 2025" (2014).
"Mercedes Is Making a Self-Driving Semi to Change the Future of Shipping," Wired (2014).

* cited by examiner

VEHICLE MIRROR CAMERA SYSTEMS

This application is a national stage application under 35 U.S.C. § 371 of PCT International Application No. PCT/US2022/032980, filed Jun. 10, 2022, which is incorporated by reference herein in its entirety.

FIELD

This technology generally relates to vehicle imaging systems and, more particularly, to vehicle mirror camera systems with improved anti-soiling and aerodynamic performance.

BACKGROUND

Vehicle systems are increasingly sophisticated and the exterior side and rear view systems employed in vehicles, including commercial vehicles, are no exception. Vehicle imaging systems designed to supplement and/or replace traditional side mirrors have been developed that include integrated camera(s) to provide drivers with more information regarding their surroundings and thereby improve vehicle safety. In such current mirror camera systems, captured images can be processed to display blind spots, rear-side views, and/or warnings, and/or to provide automated lane changing assistance, as some exemplary functionality improved by mirror camera systems over traditional mirrors.

To perform properly during inclement weather (e.g. rain), vehicle mirror camera systems must be able to generate accurate imaging data to provide a relatively clear image to the driver and to facilitate effective automation of safety functionality. However, current vehicle mirror camera systems are susceptible to soiling from environmental water, which reduces image quality and negatively impacts system output and downstream processing (e.g., automated safety warnings). Additionally, current vehicle mirror camera system arms that are mounted to the side of a vehicle have significant aerodynamic drag penalties that negatively affect overall performance of the vehicle, including with respect to fuel efficiency and vehicle range, for example.

SUMMARY

In one example, a vehicle mirror camera system (MCS) is disclosed that includes a camera enclosure housing imaging components comprising a first camera and a camera illumination source each disposed within one or more recesses of a front enclosure surface of the camera enclosure. In this particular example, the camera enclosure further includes upper, left, and right enclosure surfaces each having a declining slope in a rearward direction. The right enclosure surface further has a declining slope in a rightward direction. The upper enclosure surface also further includes a groove disposed toward the front enclosure surface. The vehicle MCS in this example further includes a mount portion configured to attach to a side of a vehicle and facilitate electrical connectivity of the imaging components to a power source of the vehicle. The mount portion includes a left mount surface that has a declining slope in a leftward direction in this example. Additionally, the vehicle MCS includes an extension portion disposed between the camera enclosure and the mount portion and including left and right extension surfaces having an inclining slope that meets the declining slope of the right enclosure surface and the left mount surface, respectively.

In another example, a vehicle MCS is disclosed that includes a camera enclosure including a front enclosure surface including one or more recesses and upper, left, and right enclosure surfaces each having a declining slope in a rearward direction. The right enclosure surface further has a declining slope in a rightward direction and the upper enclosure surface and at least a portion of one or more of the left enclosure surface or the right enclosure surface further comprises a groove disposed toward the front enclosure surface. The vehicle MCS in this example also includes a mount portion configured to attach to a side of a vehicle and including a left mount surface that has a declining slope in a leftward direction. Additionally, the vehicle MCS includes an extension portion disposed between the camera enclosure and the mount portion and including left and right extension surfaces having an inclining slope that meets the declining slope of the right enclosure surface and the left mount surface, respectively.

In yet another example, a vehicle MCS is disclosed that includes a camera enclosure housing first imaging components comprising a first camera and a camera illumination source each disposed within one or more recesses of a front enclosure surface of the camera enclosure. The camera enclosure further includes upper, left, and right enclosure surfaces each having a declining slope in a rearward direction. The right enclosure surface further has a declining slope in a rightward direction. The upper enclosure surface and at least a portion of one or more of the left enclosure surface or the right enclosure surface further includes a groove disposed toward the front enclosure surface. Additionally, the camera enclosure further includes a lower enclosure surface comprising a spoiler that is curved, protrudes out in a downward direction and extends along a perimeter of an at least partially flat portion of the lower enclosure surface. The vehicle MCS in this particular example also includes a mount portion configured to attach to a side of a vehicle and facilitate electrical connectivity of the imaging components to a power source of the vehicle. The mount portion includes a left mount surface that has a declining slope in a leftward direction. Additionally, the vehicle MCS includes an extension portion disposed between the camera enclosure and the mount portion and including left and right extension surfaces having an inclining slope that meets the declining slope of the right enclosure surface and the left mount surface, respectively.

The technology described and illustrated by way of the example herein provides a vehicle MCS with improved anti-soiling and aerodynamic performance. The vehicle MCS in some examples includes a camera enclosure with a downward sloping surface in rearward, leftward, and rightward directions to reduce water flow toward a front enclosure surface of the camera enclosure via which imaging components housed by the camera enclosure operate. The camera enclosure also includes a groove disposed toward the front enclosure surface and on an upper enclosure surface and, optionally, one or more of left and right enclosure surface, to capture water and direct the captured water away from the front enclosure surface. The vehicle MCS in some examples also includes an extension portion with a smaller cross-section height, and a lower drag penalty, than the camera enclosure and a mount portion configured to attached to a vehicle side, thereby improving the overall aerodynamic performance of the vehicle MCS.

DETAILED DESCRIPTION

Figure 1:
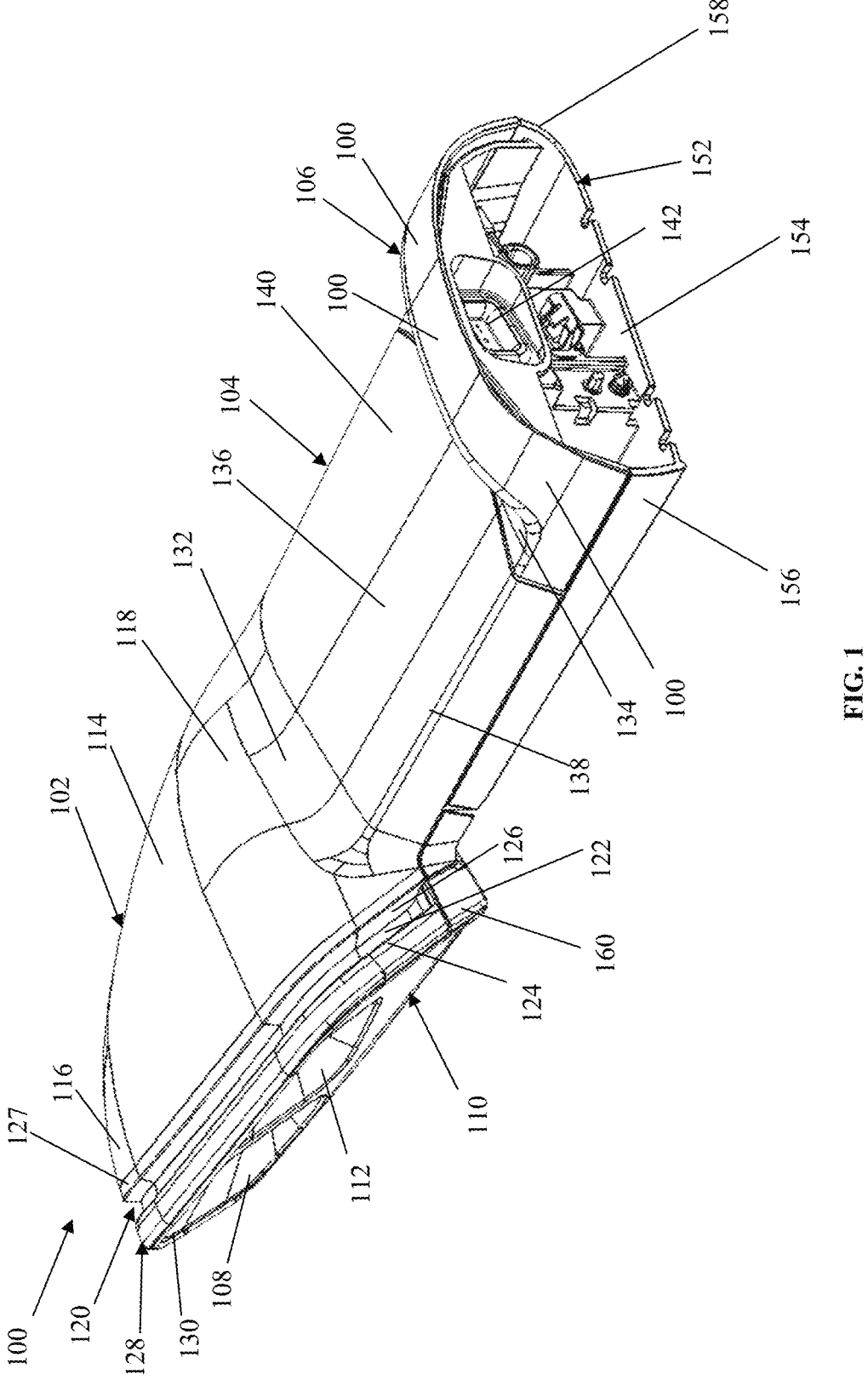
FIG. 1 is a front perspective view of an exemplary first vehicle mirror camera system (MCS)

Referring to FIG. 1, a front perspective view of a first vehicle mirror camera system (MCS) 100 according to some examples of this technology is illustrated. The first vehicle MCS 100 in this example includes a first camera enclosure 102 and an extension portion 104 disposed between the first camera enclosure 102 and a mount portion 106. While the exemplary first vehicle MCS 100 illustrated in FIGS. 1-9 is configured to be coupled to the left side of a vehicle, a mirror image of the disclosed first vehicle MCS 100 could be configured to be coupled to the right side of a vehicle. Thus, the first vehicle MCS 100, and/or its mirror image equivalent, can be provided on one or both sides of a vehicle.

The first camera enclosure 102 in this example houses imaging components including a first camera 300 having a field of view extending from the left side of the vehicle in a rearward direction. The imaging components also include a camera illumination source 302 (e.g., one or more light emitting diodes (LEDs)) in this example, and other imaging components (e.g., image sensor, processor, memory, electrical connections) can also be housed by the first camera enclosure 102. In this particular example, the first camera 300 is disposed within a first recess 108 of a first front enclosure surface 110 of the first camera enclosure 102 and the camera illumination source 302 is disposed within a second recess 112 of the first camera enclosure 102, although a single recess, a plurality of recesses (e.g., for a plurality of cameras and/or camera illumination sources), and other configurations for facilitating external visibility for at least a portion of the imaging components can also be provided via the first front enclosure surface 110 in other examples.

In addition to the first front enclosure surface 110, the first camera enclosure 102 includes a first upper enclosure surface 114, a first left enclosure surface 116, a first right enclosure surface 118, and a first lower enclosure surface 304 in this example. Each of the first upper enclosure surface 114, first left enclosure surface 116, and first right enclosure surface 118 has a declining slope in a rearward direction. Additionally, the first left enclosure surface 116 has a declining slope in a leftward direction and the first right enclosure surface 118 has a declining slope in a rightward direction. The various declining slopes of the first upper, first left, and first right enclosure surfaces 114, 116, and 118, respectively, in addition to other surface features and topologies of the exemplary first vehicle MCS 100 described and illustrated herein, facilitate improved aerodynamic performance.

The first camera enclosure 102 in this example also includes a groove 120 disposed toward the first front enclosure surface 110. The groove 120 extends along an entirety of the first upper enclosure surface 114 and a portion of each of the first left enclosure surface 116 and the first right enclosure surface 118. In other examples, the groove 120 can extend along less than an entirety of the first upper enclosure surface 114 and/or a portion of only one, or neither, of the first left enclosure surface 116 or the first right enclosure surface 118. Additionally, multiple grooves can be provided (e.g., separate grooves on one or more of the first upper enclosure surface 114, first left enclosure surface 116, and/or first right enclosure surface 118.

The groove 120 includes a recessed region 122 disposed between a front wall 124 and a rear wall 126 that in this example are each sloped away from the recessed region 122, but in other examples can be perpendicular to the recessed region 122 or sloped toward the recessed region 122, and other configurations can also be used. In this particular example, the front wall 124 is inclined away from the recessed region 122 in a frontward direction and the rear wall 126 is inclined away from the recessed region 122 in a rearward direction. The first vehicle MCS 100 in this example also includes an optional rim 128 disposed proximate the front wall 124 and having a front rim surface 130 optionally extending further in a frontward direction than the front enclosure surface.110.

The groove 120 operates to collect at least a portion of the environmental water that moves along the first upper, first left, and/or first right enclosure surfaces 114, 116, and/or 118, respectively, toward the first front enclosure surface 110, and to direct the collected water leftward and/or rightward and away from the first front enclosure surface 110 and associated first and second recesses 108 and 112, respectively, associated with the imaging components. To increase water shedding, the rear wall 126 in this example is not tangent to the first left enclosure surface 116, first upper enclosure surface 114, and first right enclosure surface 118, but instead has a horizontal offset 127 to the optional rim 128 with respect to those surfaces. Accordingly, the groove 120 facilitates improved anti-soiling with respect to the lens or other features of the first camera 300 of the imaging components, for example.

The extension portion 104 is disposed between the first camera enclosure 102 and the mount portion 106 and includes a left extension surface 132, a right extension surface 134, an upper extension surface 136, a front extension surface 138, and a rear extension surface 140 that includes at least a portion that is wider than the front extension surface 138 in a left-right direction. In this example, the left extension surface 132 has an inclining slope that meets the declining slope of the first right enclosure surface 118 to thereby form a first continuous surface that allows environmental water to flow from the first right enclosure surface 118 down the left extension surface 132, and from the first camera enclosure 102 towards the extension portion 104, in an uninterrupted manner.

The front extension surface 138 also has a declining slope in a frontward direction and the rear extension surface 140 has a declining slope in a rearward direction in this example. The declining slope in the rearward direction of the rear extension surface 140, along with the smaller cross-section height of the extension portion 104 as compared to the first camera enclosure 102 and the mount portion 106, reduces the aerodynamic drag of the first vehicle MCS 100. Additionally, the declining slope in the frontward direction of the front extension surface 138 allows the first vehicle MCS 100 to shed environmental water from that surface, among other advantages.

The mount portion 106 is configured to attach to a side of a vehicle, which in the example illustrated in FIG. 1 is the left side of the vehicle or the vehicle driver side for a left-hand drive vehicle. The mounting location can vary according to vehicle characteristics and requirements, but can be above the side window and toward a front portion of a commercial vehicle, for example. Via a port 142, the mount portion 106 facilitates electrical connectivity of the imaging components to a power source of the vehicle in this example, although the imaging components can be powered, and/or electrically coupled to a vehicle, in other ways.

The mount portion 106 in this example includes a left mount surface 144, an upper mount surface 146, a front mount surface 148, and a rear mount surface 150. The left mount surface 144 has a declining slope in a leftward direction that meets an inclining slope in a rightward direction of the right extension surface 134 to form a second continuous surface. The front mount surface 148 also has a declining slope in a frontward direction and the rear mount surface 150 has a declining slope in a rearward direction to provide an overall surface contour with a reduced aerodynamic drag penalty and improved ability to shed environmental water from the first vehicle MCS 100.

In this example, at least a portion of the first right enclosure surface 118 extends further in a frontward direction than the extension portion 104 to thereby restrict water flowing from the extension portion 104 (e.g., from the mount portion 106) toward the first front enclosure surface 110. In other words, water flowing across the front extension surface 138, for example, in a leftward direction will contact the first right enclosure surface 118 and thereby be prevented from flowing onto the first front enclosure surface 110 and/or into the first and/or second recesses 108 and 112, respectively. The reduction in environmental water flowing from the extension portion 104 onto the first front enclosure surface 110 results in improved anti-soiling with respect to the imaging components of the first vehicle MCS 100.

The first vehicle MCS 100 also includes an arm portion 152 that has a lower arm surface 154, a front arm surface 156, and a rear arm surface 158. The arm portion 152 extends across the bottom of the extension portion 104 and the mount portion 106 such that the front arm surface 156 is disposed proximate the front extension surface 138 and the front mount surface 148 and the rear arm surface 158 is disposed proximate the rear extension surface 140 and the rear mount surface 150. In particular, the front arm surface 156 is sloped or curved so as to meet the contour of the front extension surface 138 and the front mount surface 148 and the rear arm surface 158 is sloped or curved so as to meet the contour of the rear extension surface 140 and the rear mount surface 150. The inward sloped contour of the rear arm surface 158 reduces aerodynamic drag while the inward sloping contour of the front arm surface 156 directs water in the downward and rearward directions.

As illustrated more clearly in, and described and illustrated in more detail below with reference to, FIG. 3, the first camera enclosure 102 further includes a first spoiler 160 disposed proximate a first lower enclosure surface 304 of the first camera enclosure 102. The first spoiler 160 advantageously reduces the aerodynamic drag of air movement across the first lower enclosure surface 304 of the first camera enclosure 102. The first spoiler 160 creates a low pressure zone and optionally includes one or more drain holes to assist with draining of any water inside the vehicle MCS 100.

Figure 2:
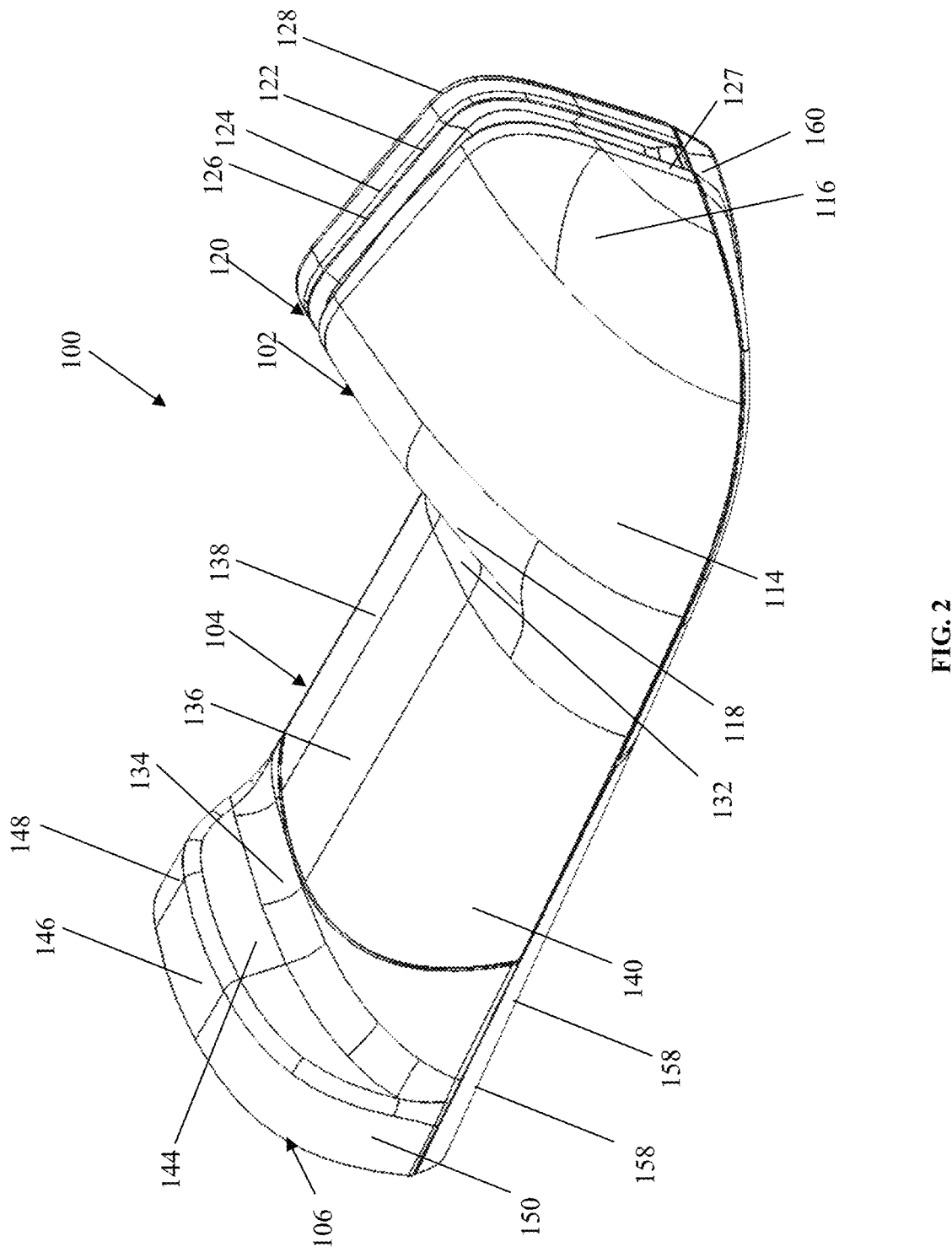
FIG. 2 is a top perspective view of the vehicle MCS of FIG. 1.

Referring to FIG. 2, a top perspective view of the first vehicle MCS 100 is illustrated. As is more clearly illustrated in FIG. 2, the left mount surface 144 has a declining slope in a leftward direction to meet the inclining slope of the right extension surface 134. Additionally, the first left enclosure surface 116, upper enclosure surface 114, and first right enclosure surface 118 have a declining slope that meets the first lower enclosure surface 304 in this example in contrast to the example described and illustrated in detail below with reference to FIG. 10 that includes a supplemental turn signal illumination source.

Figure 3:
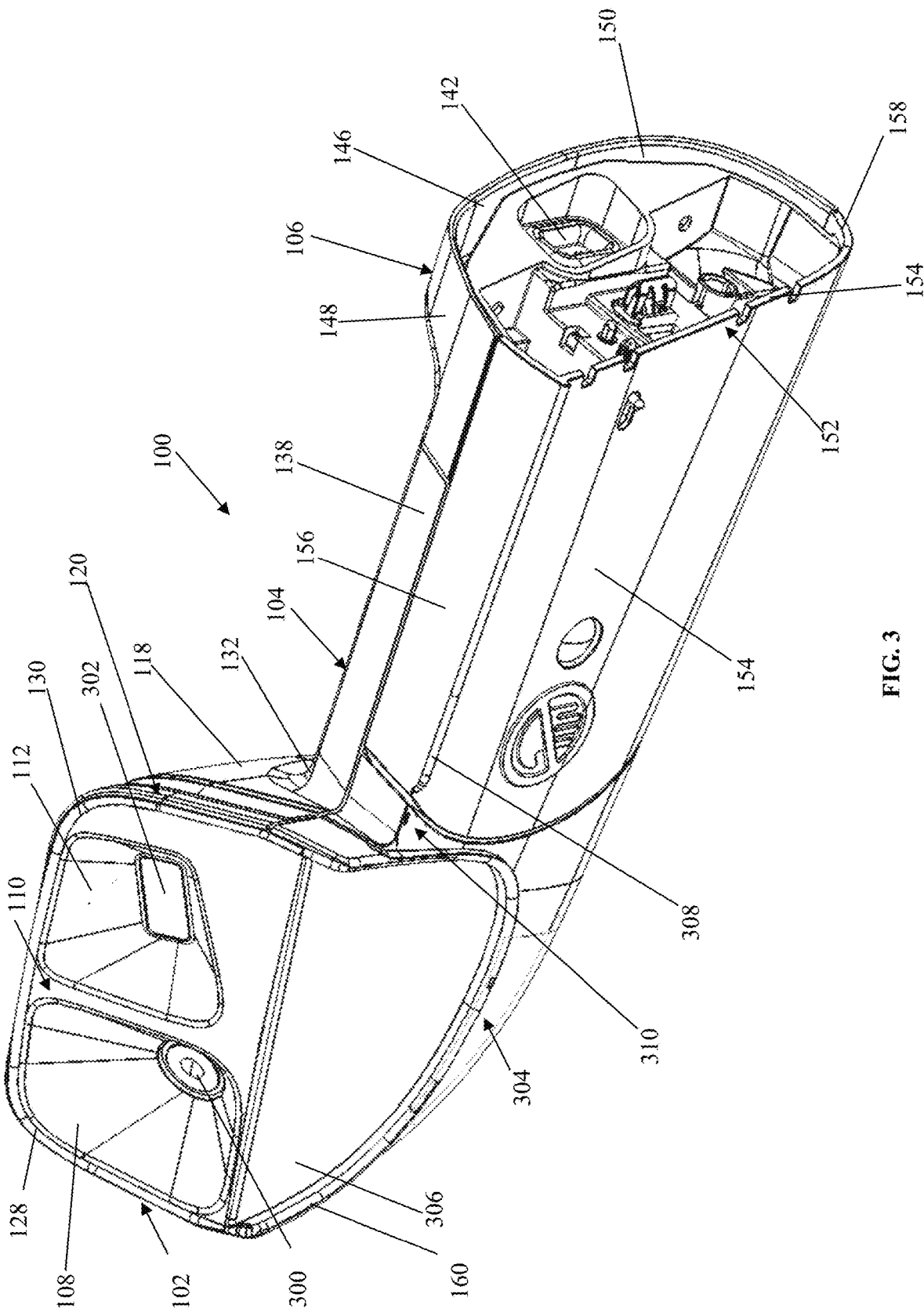
FIG. 3 is a bottom perspective view of the vehicle MCS of FIG. 1.

Referring to FIG. 3, a bottom perspective view of the first vehicle MCS 100 is illustrated. As more clearly illustrated in FIG. 3, the first camera 300 is disposed within the first recess 108 (e.g., at a circular aperture of the first recess 108) and the camera illumination source 302 is disposed within the second recess 112 (e.g., at a rectangular aperture of the second recess 112). The first camera enclosure 102 further includes a first lower enclosure surface 304 that includes the first spoiler 160 that is disposed around a portion of a perimeter of a first flat portion 306 of the first lower enclosure surface 304.

The first spoiler 160 is curved and protrudes from the first lower enclosure surface 304 in a downward direction. The first spoiler 160 also extends upward to meet both the first left enclosure surface 116 and the first right enclosure surface 118 at the groove 120. The first flat portion 306 is disposed toward a front of the first camera enclosure 102 so as to meet the first front enclosure surface 110, although other surface contours can be used for the first flat portion 306. The first spoiler 160 in this example has a smaller radius toward the first left enclosure surface 116 than toward the first right enclosure surface 118, which advantageously creates additional turbulence to cause an increased amount of water to shed rather than trip over the first spoiler 160 and onto the first camera 300.

The first vehicle MCS 100 in this example further includes a second spoiler 308 disposed between at least a portion of the front arm surface 156 and the lower arm surface 154. The second spoiler 308 extends from the mount portion 106 toward the first camera enclosure 106 but with a gap 310 between the first spoiler 160 and the second spoiler 308. The second spoiler 308 has a relatively small radius on a front edge that, combined with the gap 310, allows for water pushed outward on the first vehicle MCS 100 (e.g., from a vehicle roof cap) to shed before reaching the first spoiler 160. Additionally, the second spoiler 308 creates another low pressure zone and optionally also includes one or more drain holes to assist with draining of any water inside the vehicle MCS 100.

Figures 4, 5:
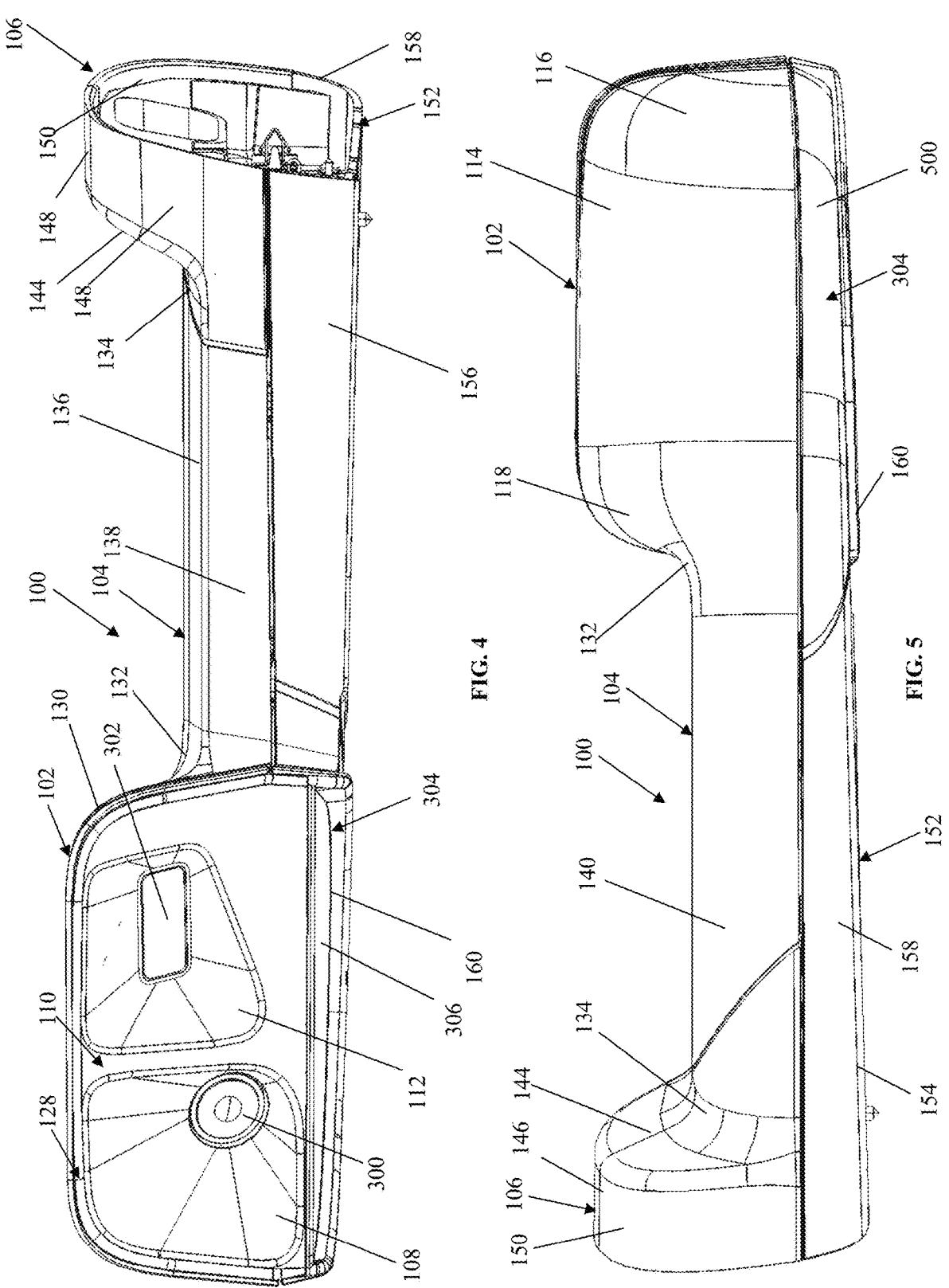
FIG. 4 is a front plan view of the vehicle MCS of FIG. 1.
FIG. 5 is a rear plan view of the vehicle MCS of FIG. 1.

Referring to FIG. 4, a front plan view of the first vehicle MCS 100 is illustrated. As illustrated by the rear mount surface 150 being disposed further to the right than the front mount surface 148 in the plan view of FIG. 4, the mount portion 106 is angled such that when mounted flush to the side of a vehicle the first vehicle MCS 100 is angled frontward to facilitate a reduced aerodynamic drag penalty while maintaining an appropriate field of view of the first camera 300.

Referring to FIG. 5, a rear plan view of the first vehicle MCS 100 is illustrated. As is more clearly illustrated in FIG. 5, the first lower enclosure surface 304 has a first rear lower enclosure surface portion 500 that has an inclining slope in a rearward direction so as to meet the first left, first upper, and first right enclosure surfaces 116, 114, and 118, respectively, which have a declining slope in the rearward direction.

Figure 6:
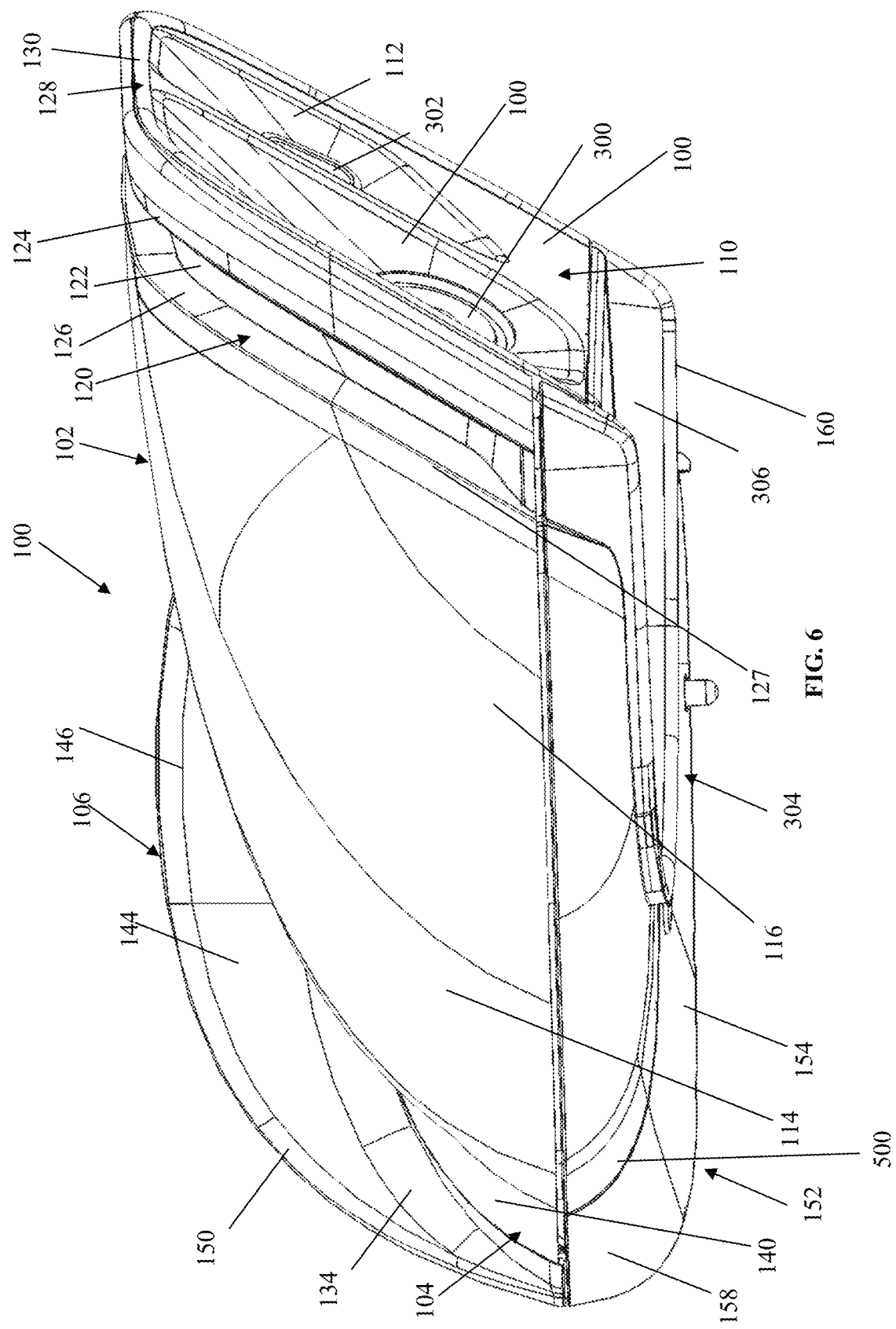
FIG. 6 is a left plan view of the vehicle MCS of FIG. 1.

Referring to FIG. 6, a left plan view of the first vehicle MCS 100 is illustrated. In the left plan view illustrated in FIG. 6, it is more clear that the first right enclosure surface 118 extends further in a frontward direction than the first left enclosure surface 116 such that the first front enclosure surface 110 is angled rearward in a leftward direction. Additionally, the right extension surface 134 extends further in a rearward direction than the left extension surface 132.

Figure 7:
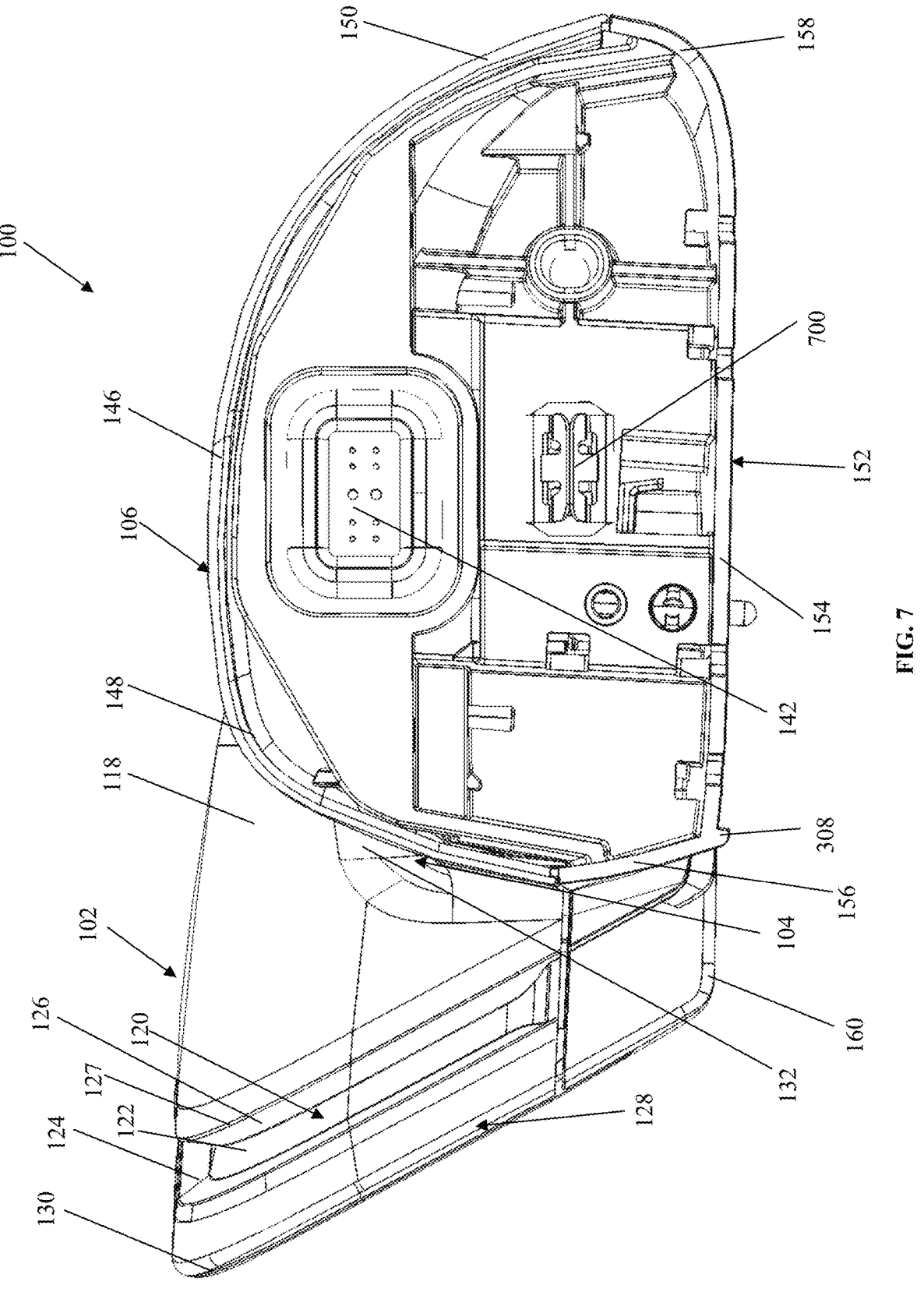
FIG. 7 is a right plan view of the vehicle MCS of FIG. 1.

Referring to FIG. 7, a right plan view of the first vehicle MCS 100 is illustrated. In some examples, the interior of the first vehicle MCS 100 can be at least partially hollow to allow for electrical connectivity of the imaging components. The mount portion 106 can be configured to attached to the side of a vehicle via a clip 700, threaded fasteners, or any other type of mounting system(s) or device(s). As is more clearly illustrated in FIG. 7, the front rim surface extends further in a frontward direction than the first spoiler 160 such that the first front enclosure surface 110 is angled rearward in an upper-lower direction.

Figure 8:
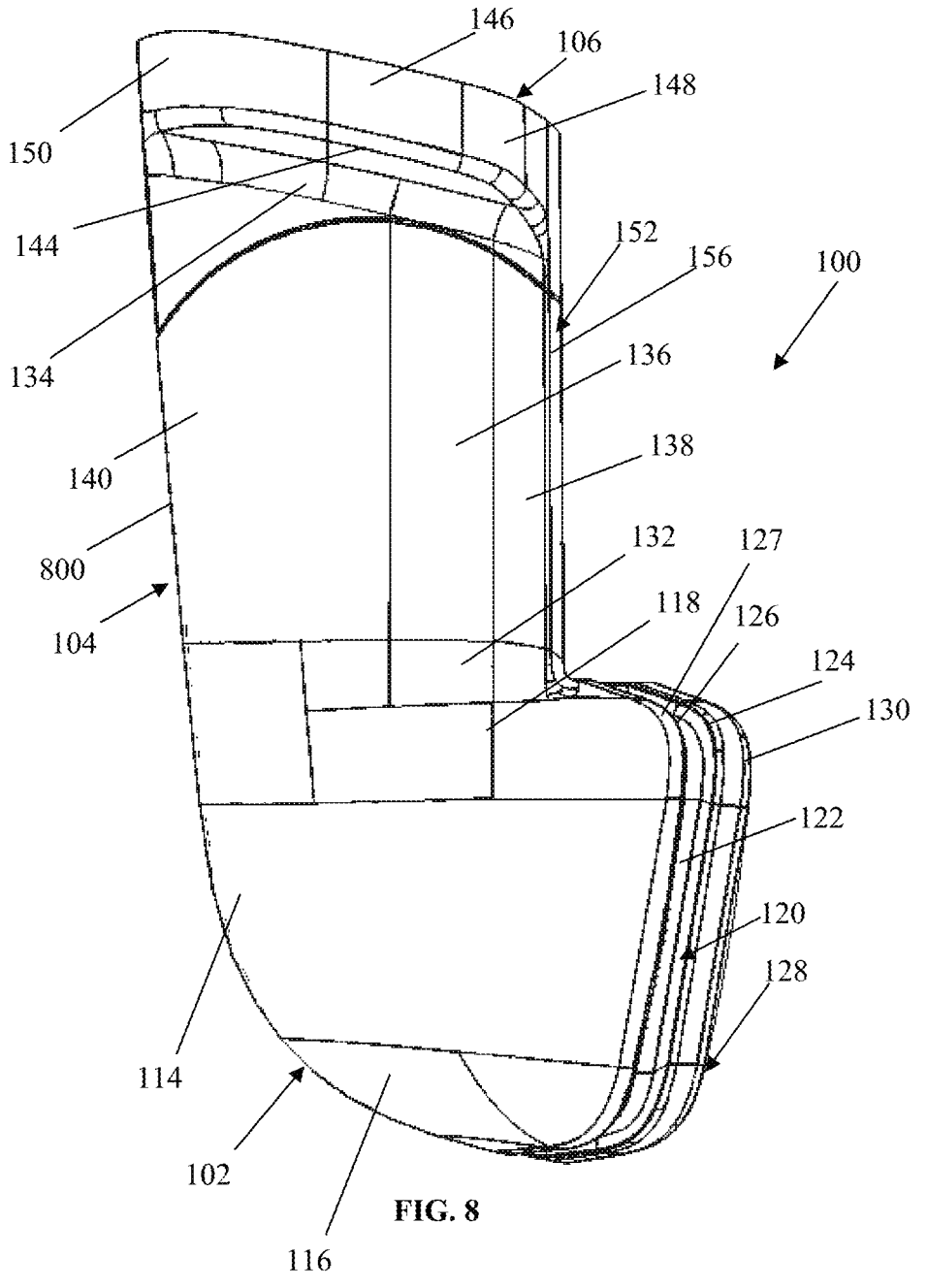
FIG. 8 is a top plan view of the vehicle MCS of FIG. 1.

Referring to FIG. 8, a top plan view of the first vehicle MCS 100 is illustrated. As is clear from this top plan view, each of the rear mount surface 150, left mount surface 144, right extension surface 134, rear extension surface 140, left extension surface 132, first right enclosure surface 118, first upper enclosure surface 114, and first left enclosure surface 116 extends further rearward than an adjacent one of those surfaces in the right-to-left direction. Accordingly, the first vehicle MCS 100 has a forward angled rear perimeter 800 at the mount portion 106, the extension portion 104, and the first right enclosure surface 118 that curves frontward at the first upper enclosure surface 114 and first left enclosure surface 116.

Figure 9:
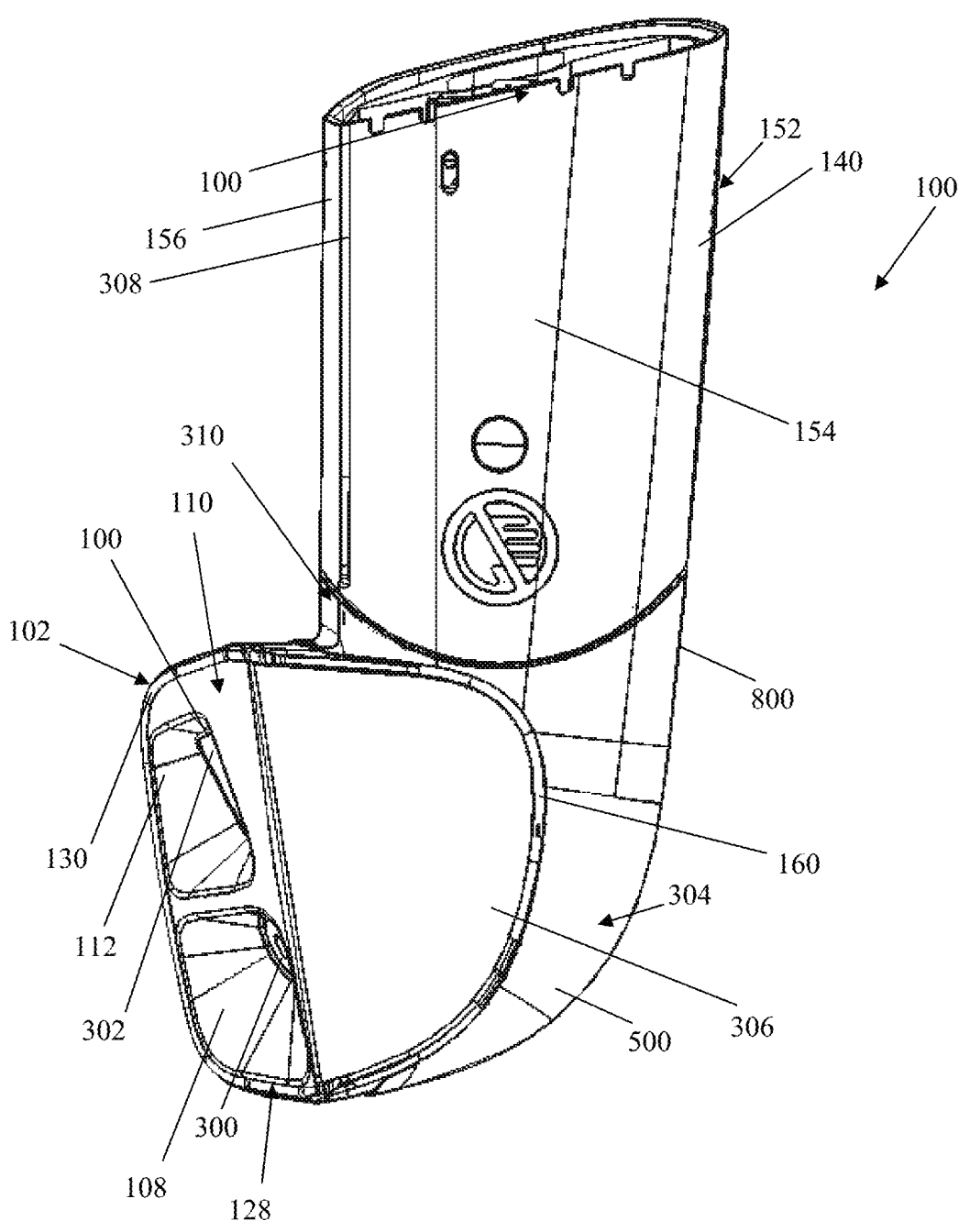
FIG. 9 is a bottom plan view of the vehicle MCS of FIG. 1.

Referring to FIG. 9, a bottom plan view of the first vehicle MCS 100 is illustrated. The bottom plan view illustrated in FIG. 9 more clearly shows the angled first front enclosure surface 110 described and illustrated above with reference to FIG. 7. Additionally, the first lower enclosure surface 304 is more clearly illustrated in FIG. 9 as including the first flat portion 306 surrounded on a portion of its perimeter by the first spoiler 160 from which the first rear lower enclosure surface portion 500 extends in rearward and upward directions.

Figure 10:
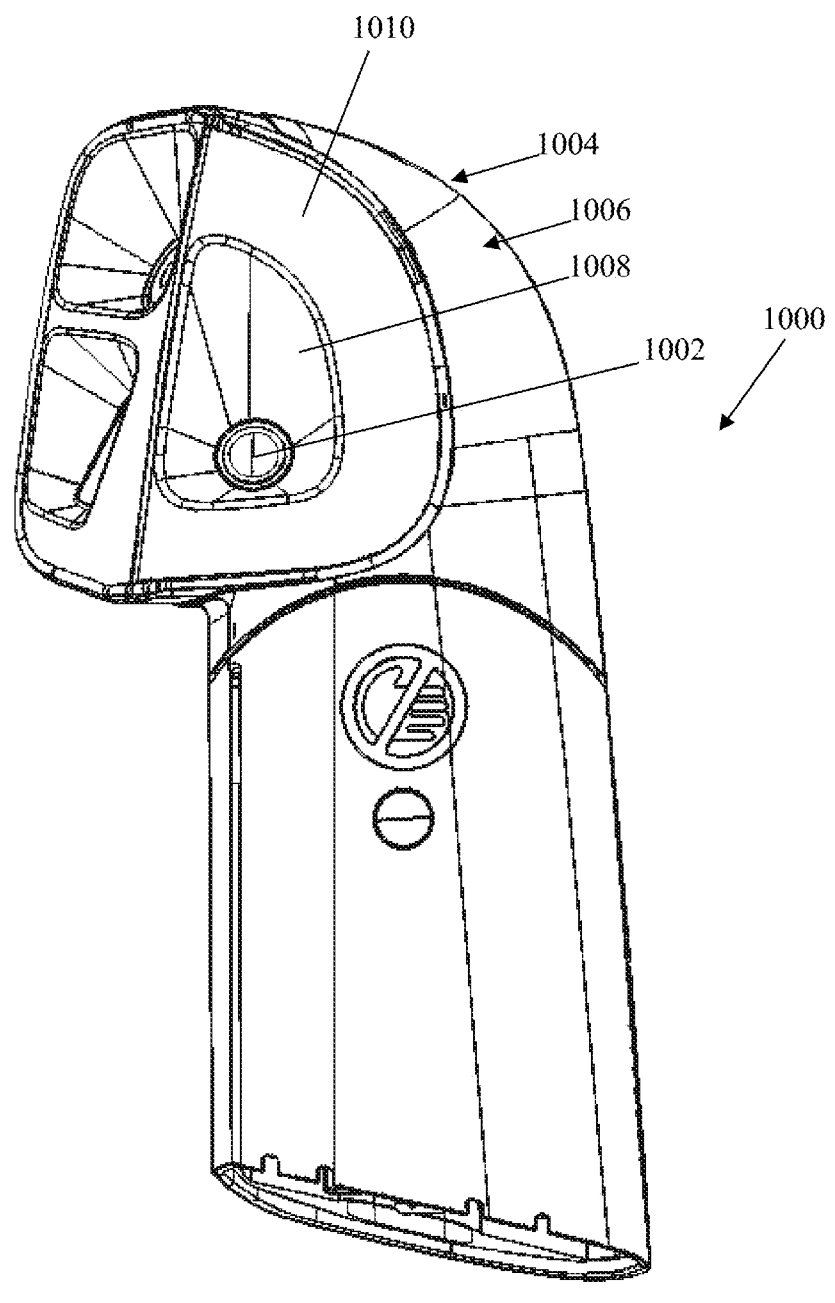
FIG. 10 is a bottom plan view of an exemplary second vehicle MCS with an optional second camera.

Referring to FIG. 10, a bottom plan view of an exemplary second vehicle MCS 1000 with an optional second camera 1002 is illustrated. The second vehicle MCS 1000 in this example is configured to attach to a right side of a vehicle. Accordingly, each of the elements of the vehicle MCS 1000 except for those elements specifically labeled in FIG. 10 is a mirror image of the corresponding element illustrated in FIGS. 1-9.

The second camera enclosure 1004 in the second vehicle MCS 1000 includes a second lower enclosure surface 1006 that includes the second camera 1002 disposed within a third recess 1008 disposed within a second flat portion 1010 of the second lower enclosure surface 1006. The second camera 1002 can be a look-down camera, for example, which can be electrically coupled to the vehicle power source via the port 142, for example. Additional imaging components can be associated with the second camera and housed by the second camera enclosure 1004 (e.g., one or more camera illumination sources, memory, and/or processor(s)). The second camera 1002 provides another perspective and an expanded field of view for the second vehicle MCS 1000 as compared to the first vehicle MCS 100.

Figure 11:
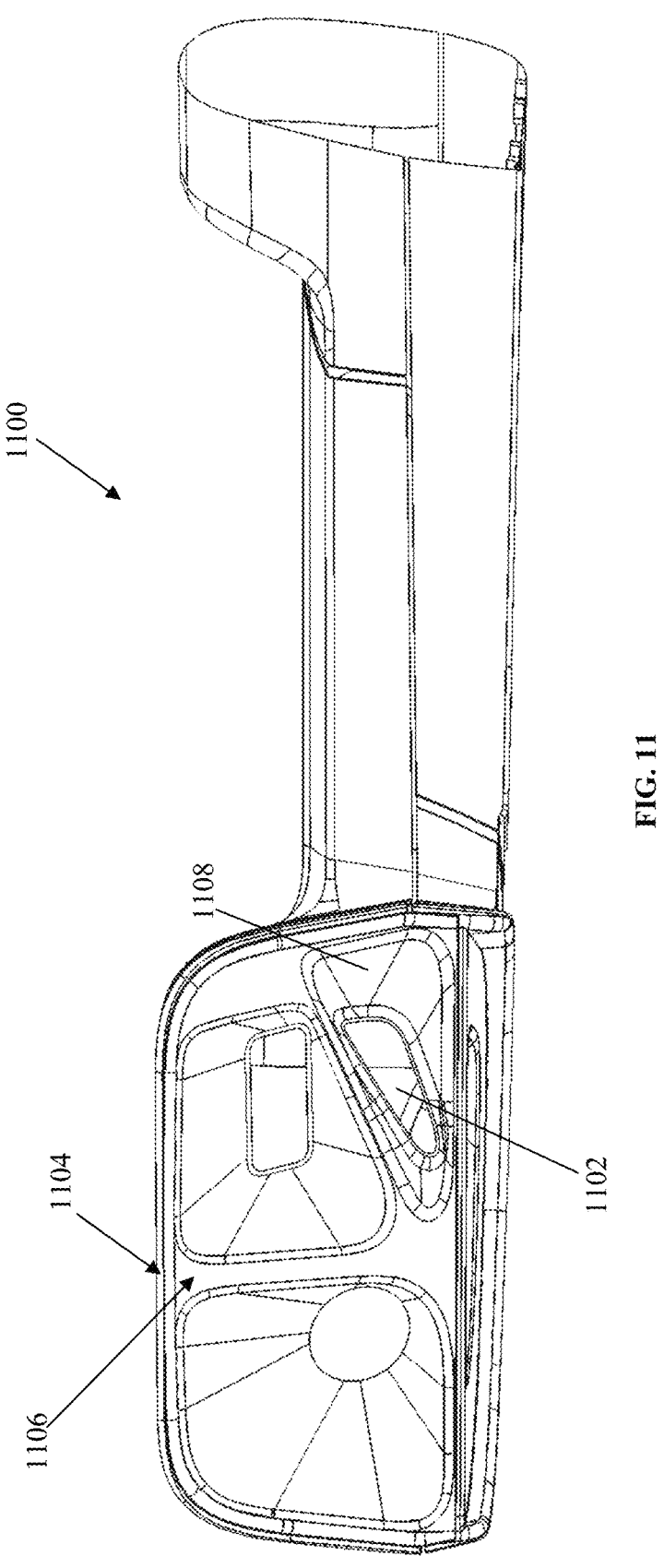
FIG. 11 is a front plan view of an exemplary third vehicle MCS with an optional mirror.

Referring to FIG. 11, a front plan view of an exemplary third vehicle MCS 1100 with an optional mirror 1102 is illustrated. Each of the elements of the third vehicle MCS 1100 except for those elements specifically labeled in FIG. 11 is equivalent to the corresponding element illustrated in FIGS. 1-9.

The third camera enclosure 1104 of the third vehicle MCS 1100 includes a second front enclosure surface 1106 that includes a fourth recess 1108 within which the mirror 1102 (e.g., a traditional glass reflective mirror) is disposed. The fourth recess 1108 is disposed rightward in the second front enclosure surface 1106 such that at least a portion of the second recess 112 is disposed between the first recess 108 and the fourth recess 1108, although other configurations for the second front enclosure surface 1106 can also be used in other examples. The mirror 1102 advantageously provides another manner in which the rear, side, and/or downward directions can be viewed by a driver and/or passenger of the vehicle to thereby improve safety of the third vehicle MCS 1100.

Figure 12:
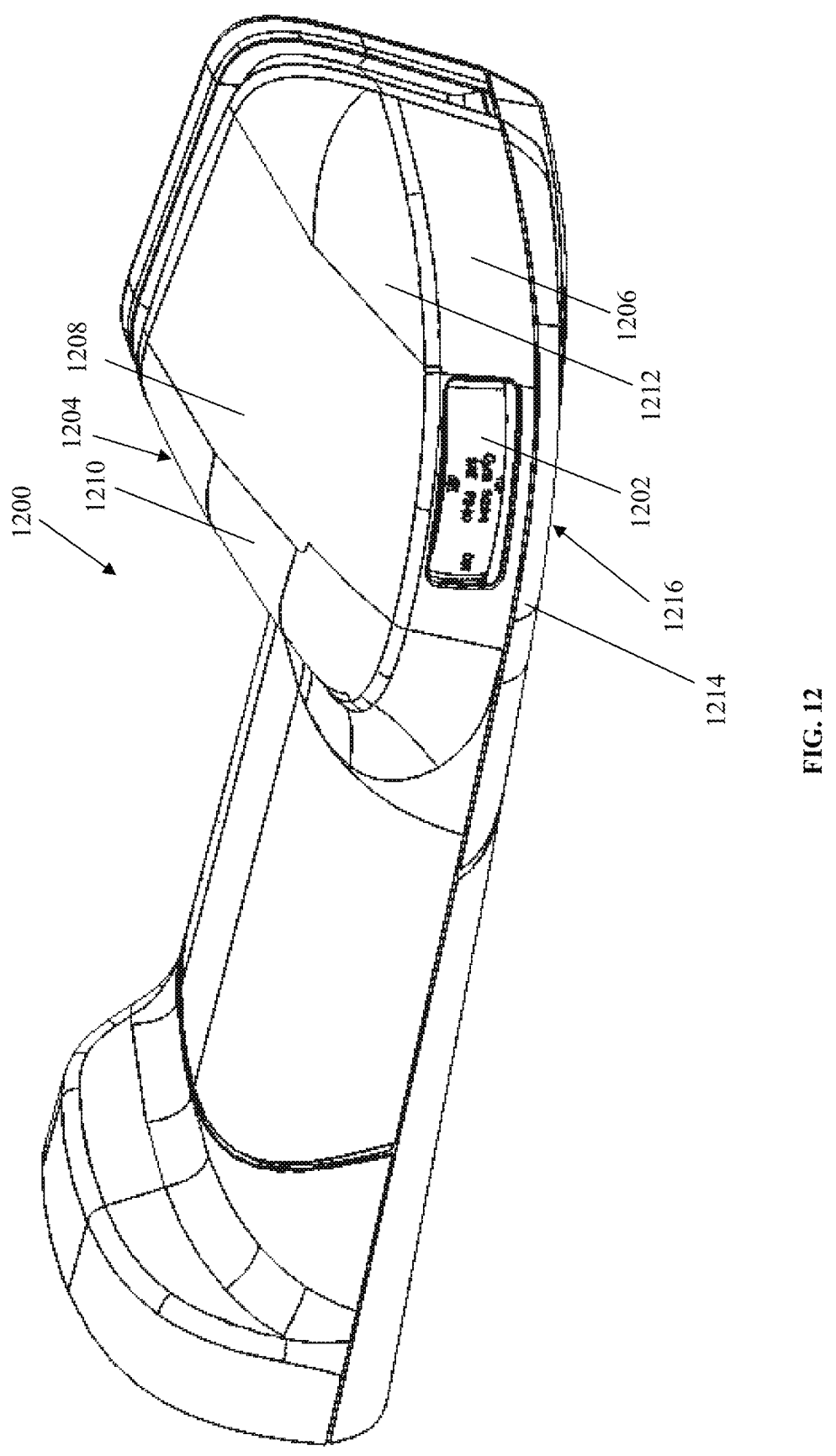
FIG. 12 is a rear plan view of an exemplary fourth vehicle MCS with an optional supplemental turn signal illumination source.

Referring to FIG. 12, a rear plan view of an exemplary fourth vehicle MCS 1200 with an optional supplemental turn signal illumination source 1202 is illustrated. Each of the elements of the third vehicle MCS 1100 except for those elements specifically labeled in FIG. 11 is equivalent to the corresponding element illustrated in FIGS. 1-9.

The fourth camera enclosure 1204 in the fourth vehicle MCS 1200 includes a rear enclosure surface 1206 that is curved and extends between the second upper enclosure surface 1208, second right enclosure surface 1210, and second left enclosure surface 1212 and the second rear lower enclosure surface 1214. The rear enclosure surface 1206 has a declining slope in rearward and downward directions to meet the rearward and downward declining slopes of the second upper enclosure surface 1208, second right enclosure surface 1210, and second left enclosure surface 1212 as well as the second rear lower enclosure surface portion 1214 of the second lower enclosure surface 1216 that has an upward slope in a rearward direction.

In the fourth vehicle MCS 1200, the supplemental turn signal illumination source 1202 is disposed proximate the rear enclosure surface 1206 and optionally has a curved surface contour matching the contour of the rear enclosure surface 1206, although other shapes for the supplemental turn signal illumination source 1202 and/or other types of supplemental turn signal indicators can also be used in other examples. The supplemental turn signal illumination source 1202 in this example is advantageously visible to nearby traffic to thereby improve safety of the fourth vehicle MCS 1200.

With the technology disclosed herein, soiling of imaging components can be reduced in vehicle MCSs that have a reduced aerodynamic drag penalty. The exemplary vehicle MCSs disclosed herein reduce the flow of environmental water toward imaging components based on advantageous surface contours an features including a groove that collects water and diverts the collected water leftward and rightward away from the imaging components. An extension portion of the exemplary vehicle MCSs disclosed herein advantageously has a smaller cross-section height than a camera enclosure and a mount portion, between which the extension portion is disposed, in order to improve aerodynamic performance.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A vehicle mirror camera system (MCS), comprising:
a camera enclosure housing first imaging components comprising a first camera and a camera illumination source each disposed within one or more recesses of a front enclosure surface of the camera enclosure, wherein:
the camera enclosure further comprises upper, left, and right enclosure surfaces each having a declining slope in a rearward direction, wherein the right enclosure surface further has a declining slope in a rightward direction; and
the upper enclosure surface further comprises a groove disposed toward the front enclosure surface;
a mount portion configured to attach to a side of a vehicle and facilitate electrical connectivity of the first imaging components to a power source of the vehicle, wherein the mount portion comprises a left mount surface that has a declining slope in a leftward direction;
an extension portion disposed between the camera enclosure and the mount portion and comprising left and right extension surfaces having an inclining slope that meets the declining slope of the right enclosure surface and the left mount surface, respectively; and
wherein the camera enclosure further comprises a lower enclosure surface having a first spoiler that is curved, protrudes out in a downward direction, and extends along a perimeter of an at least partially flat portion of the lower enclosure surface.

2. The vehicle MCS of claim 1, wherein:
the left enclosure surface has a declining slope in a leftward direction; and
the groove extends along an entirety of the upper enclosure surface and at least a portion of one or more of the left or right enclosure surfaces.

3. The vehicle MCS of claim 1, wherein the inclining slope of the left extension surface meets the declining slope of the right enclosure surface to thereby form a first continuous surface and the inclining slope of the right extension surface meets the declining slope of the left mount surface to thereby form a second continuous surface.

4. The vehicle MCS of claim 1, wherein the extension portion further comprises upper, front, and rear extension surfaces, wherein the front extension surface has a declining slope in a frontward direction and the rear extension surface has a declining slope in a rearward direction.

5. The vehicle MCS of claim 1, wherein the extension portion comprises:
a smaller cross-section height than the camera enclosure and the mount portion; and
a front extension surface that is narrower than a rear extension surface.

6. The vehicle MCS of claim 1, wherein the mount portion further comprises upper, front, and rear mount surfaces, wherein the front mount surface has a declining slope in a frontward direction and the rear mount surface has a declining slope in a rearward direction.

7. The vehicle MCS of claim 1, wherein the groove extends along at least a portion of each of the left and right enclosure surfaces and the first spoiler extends upward to meet both the left enclosure surface and the right enclosure surface at the groove.

8. The vehicle MCS of claim 1, wherein the first spoiler has a smaller radius toward the left enclosure surface and the vehicle MCS further comprises a second spoiler disposed between a front extension surface of the extension portion and a front arm surface of an arm portion of the vehicle MCS and extends leftward without intersecting the first spoiler.

9. The vehicle MCS of claim 1, further comprising a rim disposed between a front wall and the front enclosure surface and the rim comprises a front rim surface that extends further in a frontward direction than the front enclosure surface, wherein the groove comprises a recessed region disposed between front and rear walls that are each sloped away from the recessed region and the rear wall is horizontally offset with respect to the rim and from one or more of the upper, left, or right enclosure surfaces.

10. The vehicle MCS of claim 1, wherein:
the right enclosure surface extends further in a frontward direction than the left enclosure surface; and
the front enclosure surface is disposed further in a frontward direction than the mount portion and the extension portion.

11. The vehicle MCS of claim 1, wherein the first camera is disposed within a first one of the recesses and the camera illumination source is disposed within a second one of the recesses.

12. The vehicle MCS of claim 11, further comprising a mirror disposed within a third recess of the front enclosure surface, wherein at least a portion of the second recess is disposed between the first and third recesses.

13. The vehicle MCS of claim 1, wherein the camera enclosure further comprises a lower enclosure surface comprising a second camera disposed within another recess disposed within the lower enclosure surface.

14. The vehicle MCS of claim 1, wherein:
the camera enclosure further comprises a lower enclosure surface and a rear enclosure surface disposed between at least a portion of the left, right, and upper enclosure surfaces and at least another portion of the lower enclosure surface; and
the vehicle MCS further comprises a supplemental turn signal illumination source disposed proximate the rear enclosure surface.

15. A vehicle mirror camera system (MCS), comprising:
a camera enclosure comprising a front enclosure surface comprising one or more recesses and upper, left, and right enclosure surfaces each having a declining slope in a rearward direction, wherein the right enclosure surface further has a declining slope in a rightward direction and the upper enclosure surface and at least a portion of one or more of the left enclosure surface or the right enclosure surface further comprises a groove disposed toward the front enclosure surface;
a mount portion configured to attach to a side of a vehicle and comprising a left mount surface that has a declining slope in a leftward direction; and
an extension portion disposed between the camera enclosure and the mount portion and comprising left and right extension surfaces having an inclining slope that meets the declining slope of the right enclosure surface and the left mount surface, respectively; and wherein the camera enclosure further comprises a lower enclosure surface having a first spoiler that is curved, protrudes out in a downward direction, and extends along a perimeter of an at least partially flat portion of the lower enclosure surface.

16. The vehicle MCS of claim 15, wherein the camera enclosure houses first imaging components comprising a first camera and a camera illumination source each disposed within one or more of the recesses.

17. The vehicle MCS of claim 15, wherein:

the extension portion further comprises upper, front, and rear extension surfaces, wherein the front extension surface has a declining slope in a frontward direction and the rear extension surface has a declining slope in a rearward direction; and the mount portion further comprises upper, front, and rear mount surfaces, wherein the front mount surface has a declining slope in a frontward direction and the rear mount surface has a declining slope in a rearward direction.

18. The vehicle MCS of claim 15, wherein the camera enclosure further comprises a lower enclosure surface comprising a spoiler that is curved, protrudes out in a downward direction and extends along a perimeter of an at least partially flat portion of the lower enclosure surface.

19. A vehicle mirror camera system (MCS), comprising:

a camera enclosure housing first imaging components comprising a first camera and a camera illumination source each disposed within one or more recesses of a front enclosure surface of the camera enclosure, wherein:

the camera enclosure further comprises upper, left, and right enclosure surfaces each having a declining slope in a rearward direction, wherein the right enclosure surface further has a declining slope in a rightward direction;

the upper enclosure surface and at least a portion of one or more of the left enclosure surface or the right enclosure surface further comprises a groove disposed toward the front enclosure surface; and the camera enclosure further comprises a lower enclosure surface having a spoiler that is curved, protrudes out in a downward direction, and extends along a perimeter of an at least partially flat portion of the lower enclosure surface;

a mount portion configured to attach to a side of a vehicle and facilitate electrical connectivity of the imaging components to a power source of the vehicle, wherein the mount portion comprises a left mount surface that has a declining slope in a leftward direction; and an extension portion disposed between the camera enclosure and the mount portion and comprising left and right extension surfaces having an inclining slope that meets the declining slope of the right enclosure surface and the left mount surface, respectively.

* * * * *